United States Patent
Puigardeu Aramendia et al.

(10) Patent No.: US 8,848,251 B2
(45) Date of Patent: Sep. 30, 2014

(54) HALFTONING PRINTING WITH A PAGE-WIDE-ARRAY PRINTER

(71) Applicant: Hewlett-Packard Development Company, L.P., Houston, TX (US)

(72) Inventors: Sergio Puigardeu Aramendia, Barcelona (ES); Ángel Martinez Barambio, Barcelona (ES); M. Isabel Borrell Bayona, Barcelona Manresa (ES); Luis García Garcia, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/753,777

(22) Filed: Jan. 30, 2013

(65) Prior Publication Data
US 2014/0211221 A1    Jul. 31, 2014

(51) Int. Cl.
*H04N 1/60* (2006.01)
*G06K 15/02* (2006.01)

(52) U.S. Cl.
CPC .................. *G06K 15/1881* (2013.01)
USPC .............. 358/3.06; 358/1.8; 358/1.9

(58) Field of Classification Search
USPC .......................... 358/1.8, 1.9, 3.03
See application file for complete search history.

(56) References Cited

U.S. PATENT DOCUMENTS

| | | | |
|---|---|---|---|
| 8,018,634 B2 | 9/2011 | Vanhooydonck et al. | |
| 2005/0260021 A1 | 11/2005 | Abello | |
| 2008/0239338 A1 | 10/2008 | Bailey et al. | |
| 2009/0244118 A1* | 10/2009 | Kakutani | 347/6 |
| 2010/0020358 A1* | 1/2010 | Tomomatsu | 358/3.06 |
| 2010/0245924 A1* | 9/2010 | Chang | 358/3.04 |
| 2012/0050814 A1* | 3/2012 | Tanaka | 358/3.03 |

FOREIGN PATENT DOCUMENTS

KR    20050050753    6/2005

OTHER PUBLICATIONS

Kekre, et al., "Restoration of Color Halftone image by using Fast Inverse Half toning Algorithm," 2009 International Conference on Advances in Recent Technologies in Communication and Computing, Oct. 27-29, 2009, pp. 650-656.

* cited by examiner

*Primary Examiner* — Qian Yang

(57) ABSTRACT

A page-wide-array printer has a print unit including an array of print-heads, wherein a printing direction is defined by a relative movement between the print unit and a print medium during a printing process. The page-wide-array printer receives a continuous tone image and divides the continuous tone image into a series of slices along a printing direction. Halftone image data is generated from each of the slices using error diffusion halftoning. The error diffusion halftoning comprises processing, with regard to error diffusion, each slice pixel-by-pixel following a processing pattern mainly oriented along a main processing direction which is parallel to the printing direction. The page-wide-array printer prints the halftone image data along the printing direction.

15 Claims, 3 Drawing Sheets

HALFTONING PRINTING WITH A PAGE-WIDE-ARRAY PRINTER

Page-Wide-Array printers print a whole page with a single relative movement between a print unit and a print medium. In these printers the traditional concept of a carriage that moves in a scan direction while it deposes colorant on media in a swath-wise manner is no longer valid. Page-Wide-Array printers allow significant printing throughput improvements. However, current Page-Wide-Array printers normally require that a whole page or image is processed before being printed.

BRIEF DESCRIPTION OF THE DRAWINGS

Examples will be described, by way of example only, with reference to the accompanying drawings in which corresponding reference numerals indicate corresponding parts and in which.

DETAILED DESCRIPTION OF EMBODIMENTS

The description refers to a page-wide-array printer and a method of printing with such a page-wide-array printer.

Figure 1:
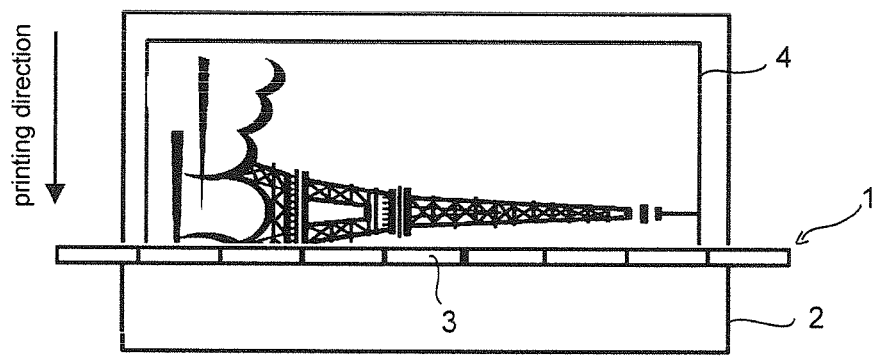
FIG. 1 is an illustration of an example page-wide-array printer which has a print unit that spans the width of a print medium.

FIG. 1 is a schematic illustration of an example page-wide-array (PWA) printer. The PWA printer includes a print unit 1 that has a print width of an entire printable width of a print medium 2. The print unit 1 may be broader than the entire printable width of the print medium 2 and may, for example, cover the whole width of a print medium, e.g. a paper sheet to be printed on. Furthermore, the print unit 1 may extend over the maximum printable width of the printer, in other words, it covers an effective width of a paper path of the PWA printer. The print unit 1 may have multiple print-heads 3 that are arranged as an array. Thus, the print unit 1 acts as one single (large) print-head for printing a printout 4 on the print medium 2. The PWA printer prints an entire page by a single relative movement between the print unit 1 and the print medium 2 during a printing action. For example, the print unit 1 is maintained in a static position while printing as the print medium 2 advances under the printing unit 1 along the printing direction indicated by an arrow in FIG. 1. Hereinafter, this relative movement during the printing action defines a "printing direction".

Some example PWA printers move the print medium 2 forward in a continuous or even constant movement during the printing action. For example, after printing of a page has started the PWA printer does not stop feeding the print medium 2 until it reaches the end of a page.

From a user's point of view, the PWA printer can print documents containing continuous tones. For example, such documents include pixel-based images like scanned images or photos taken from a digital camera or generated by a computer. In some examples such documents include vector format images or any page description language information describing a page, which are to be rasterized by the printer before printing, i.e. converted into a (pixel-type) continuous tone image. To this end, the PWA printer may be equipped with a raster image processor (RIP) that can convert a vector format image and/or page description language information into a continuous tone image. In the context of the present document, however, "receiving a continuous tone image" includes both cases, i.e. with or without employing a rasterizing process or the RIP for receiving the continuous tone image.

Furthermore, this user's point of view that the PWA printer can print continuous tone images strictly means several processing steps, e.g. a halftoning process that enables the printer to convert the continuous tone image information into binary information specifying whether a colorant (e.g. ink or toner) is to be printed or not at a specific position of the print medium 2, as discussed in detail below.

The continuous tone image includes a pixel matrix, wherein each pixel is represented by a certain number of bits describing a specific tone, i.e. an intensity and/or color information. The tone represented by a pixel is a value from an allowable range of tones given by the certain number of bits, e.g. a pixel value can be in the range of 0 to 255 for 8-bit continuous tone images.

Thus, in the continuous tone image each pixel has a certain value within the allowable range of tones, whereas an output of the printer is discrete or, in other words, binary, i.e. the printer can either print or not print a colorant at a specific position of the print medium. In order to reproduce a specific tone of the continuous tone image the printer has to place its colorant(s) in a suitable pattern of colorant dots on the print medium to achieve the visual effect of the specific tone. This pattern of colorant dots is represented by the halftone image data, wherein the halftone image data is a pixel matrix of binary information with regard to the printer's colorant(s). The binary reproduction relies on an optical illusion; the tiny colorant dots are blended into smooth tones by the human eye. Correspondingly, the halftoning process transforms continuous tones from a given continuous tone image to limited tones the printer can reproduce printed with a limited colorant set. For example, such a colorants set is cyan, magenta, yellow and black (CMYK) in the case of a four-color printer or, in other examples only black in the case of a monochrome printer. Thus, the halftone image data may comprise (binary) information for one or more colorants. To summarize, in order to print the continuous tone image, the printer converts this image into halftone image data, which is binary information specifying printing patterns for the colorant dots of one or more of the printer's colorants.

The resolution of the continuous tone image and the resolution of the printer (i.e. the halftone image) can be different. Furthermore, as the specific tones (i.e. pixels) of the continuous tone image are reproduced by spatial patterns of colorant dots, there is a further discrepancy in resolution between the continuous tone image and the corresponding halftone image. Therefore, a specific region of the continuous tone image is reproduced as a coinciding area in the halftone image data, wherein the number of pixels in each of these areas might be different.

Figure 2:
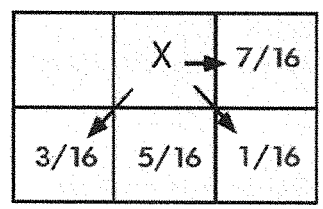
FIG. 2 is an illustration of error propagation in an error diffusion halftoning method.

Halftoning means quantization of continuous tones of the continuous tone image into the binary halftoning image data to reproduce the continuous tones with the limited tones of the printer. To reproduce the continuous tone image the PWA printer uses an error diffusion halftoning algorithm, which takes into account quantization residuals (errors) and carries them forward into neighboring pixels: If the residual exceeds a threshold, it is carried forward into the surrounding, not yet processed pixels to generate accurate colors in the printout. This requires processing all the pixels of the continuous tone image sequentially. FIG. 2 shows an example of a residual error "X" being carried forward to the (not yet processed) surrounding pixels, wherein in FIG. 2 the error diffusion algorithm is processed in the horizontal direction.

In the following description, the term "carrying forward an error" denotes a process of carrying forward an error value into immediately neighboring pixels only, whereas the term "diffusing an error" denotes propagation of an error value over a range that can extend farther than the immediately neighboring pixels. The present error diffusion halftoning algorithm causes both effects, i.e. in a direct manner the "carrying forward" and in an indirect manner the "diffusing" of an error originating from a specific pixel. This is due to the fact that the error diffusion halftoning algorithm actively carries forward this error value into (only) the immediately neighboring pixels, as illustrated in FIG. 2. The second effect, i.e. the diffusion of this error, is only a consequence of the functioning of this algorithm, which processes the image pixel-by-pixel in a consecutive manner. As the algorithm carries forward the error into (not yet processed) neighboring pixels, this carried forward error will be automatically taken into account when the algorithm advances to such a neighboring pixel, which, thus, already "carries" this error. Consequently, when halftoning this neighboring pixel, which is already carrying this error as an error contribution originating from a preceding pixel, the error contribution will in turn be actively carried further forward into the next neighboring pixel, and so on. This is the "diffusion" effect, which is only a side-effect of the current algorithm actively carrying errors by an one-pixel distance ahead, in its processing direction.

Thus, diffusing an error means that the error value is also (finally) distributed to remote pixels beyond the immediately neighboring pixels, wherein the greater the remoteness of a specific surrounding pixel the less affected by the error it is. Hence, there is an (effective) diffusion range that is defined by the distance between the origin of this specific (diffused) error and the nearest remote pixel that is simply speaking—"practically not affected" by the diffusion of this specific error. "Practically not affected" means that the diffusion of this specific error no longer has sufficient strength to cross a certain threshold into this remote pixel. However, this remote pixel might be practically affected by the diffusion of errors originating from other neighboring pixels.

Figure 3:
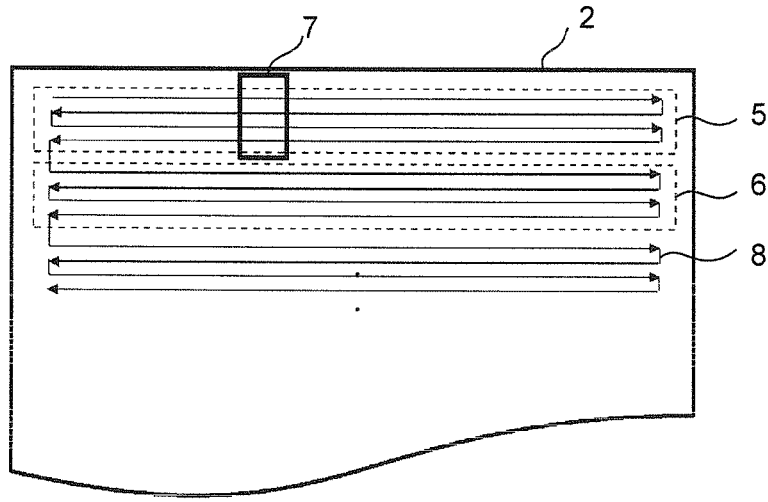
FIG. 3 is an illustration of a scanning type printer that prints in a swath-by-swath manner.

In scanning type printers a print-head 7 is mounted on a horizontally moveable carriage for printing a page swath-by-swath. Such a swath includes many, e.g. several hundred, lines of the halftone image data. In detail, a scanning type printer prints an entire page by completely halftoning a first swath 5, then printing this first swath 5 and, while printing this swath 5, halftoning a second, consecutive swath 6, then, after having printed the first swath 5, feeding the print medium to the position of the second swath 6 in order to print the second swath 6 and so on, until the full page (strictly speaking the printout 4) is printed. Thus, whenever an amount of halftoned data is sufficient to fill a swath, the printer prints this information. FIG. 3 illustrates this "printing while processing" method. This printing method of scanning type printers is employed by current application-specific integrated circuits (ASIC) of scanning type printers. These ASICs are optimized for halftoning continuous tone images pixel-by-pixel in directions back and forth with regard to the moving print-head, i.e. parallel to the direction of movement of the print-head 7, but not in the same direction as the movement but rather in a reciprocating negative and positive sense. This processing pattern 8 is illustrated in FIG. 3.

Figure 4:
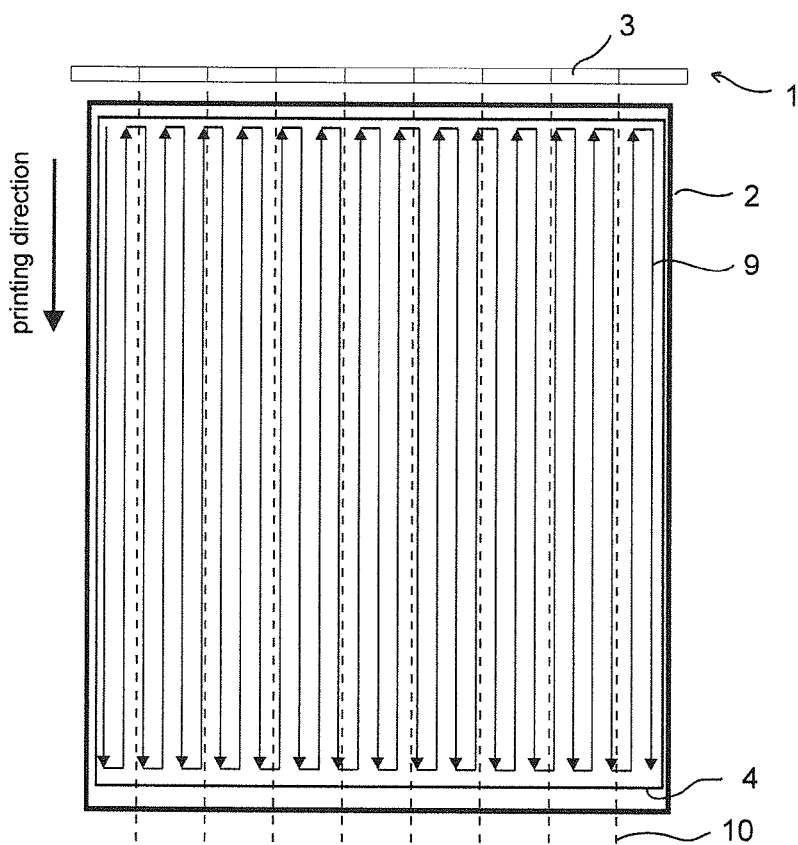
FIG. 4 is an illustration of an example page-wide-array printer that carries out halftoning using a serpentine halftoning pattern.

The present PWA printer employs a halftoning algorithm for processing the continuous tone image pixel-by-pixel following a processing pattern 9 mainly oriented along a main processing direction, which is parallel to the printing direction. For example, the error diffusion halftoning algorithm may be processed along a serpentine pattern 9, i.e. mainly in vertical directions in FIG. 4. The serpentine pattern 9 improves the diffusion of residual errors of the error diffusion algorithm. Furthermore, this allows the use of an existing ASIC of a scanning type printer, which (originally) allows only the processing of halftoning in back and forth directions parallel to the direction of movement of the scanning printer's print-head—which now corresponds to the printing direction of the PWA printer.

An example PWA printer may have a single ASIC, which originally was designed for a scanning type printer. Although this ASIC is designed for supporting (only) a single print-head, the PWA printer is configured to support all print-heads 3 of the print unit 1 using this single ASIC. For example, the ASIC may generate halftoning image data step-by-step for each of the print-heads 3 of the PWA printer's print unit 1. In this example, a single ASIC generates halftoning image data for each of the print-heads 3 in a consecutive manner. Thus, the PWA printer may be configured to supply halftone image data to all the individual print-heads 3 of print unit 1 in turn or, in other words, according to the round robin principle.

In this example, error diffusion residuals may be carried forward from one print-head 3 to its neighboring print-head 3 when processing halftoning for each of the print-heads 3 in a consecutive order. Furthermore, the error diffusion halftoning algorithm can be carried out in a seamless manner over the full page width (strictly speaking over the width of the continuous tone image). This can reduce image quality artifacts produced at the boundaries 10 of the print-heads 3, which are illustrated by the dashed vertical lines in FIG. 4.

Figure 5:
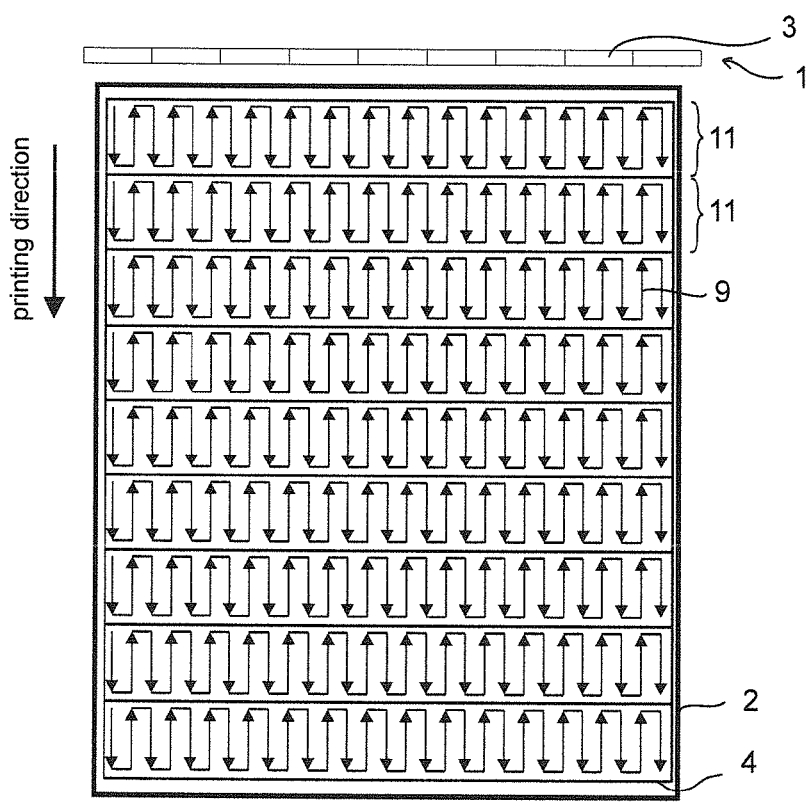
FIG. 5 is an illustration of an example page-wide-array printer configured processes halftoning in a slice-by-slice manner.

As illustrated in FIG. 5, the PWA printer is configured to divide the continuous tone image into a series of slices 11, which are consecutive along the printing direction. In some examples, each slice 11 spans the entire width of the continuous tone image. The slices 11 allow the PWA printer to (independently) process halftoning on smaller regions (i.e. the slices 11) of the continuous tone image than on the entire image. This can reduce the amount of system resources required for halftoning. Furthermore, this enables some, examples of PWA printers to start printing before the entire continuous tone image (i.e. all slices 11) has been completely halftoned. For example, a specific slice 11 can be printed as soon as it has been completely halftoned. This reduces printing time. As illustrated in FIG. 5, the serpentine pattern 9 may be also applied to each of the slices 11.

According to an optional feature, the PWA printer employs a single ASIC (designed for scanning type printers) for executing the halftoning process of a (complete) slice 11. In some examples, the slice 11 spans at least two, or even all, print-heads 3 of the print unit 1. Therefore, the PWA printer may be configured to support all the print-heads 3 using the single ASIC.

To summarize, in one example dividing the continuous tone image into a series of slices 11 along the printing direction allows halftone image data to be independently generated from each of the slices 11 using error diffusion halftoning and, thereby, reducing system resources. With regard to error diffusion, each slice 11 can be processed pixel-by-pixel following the serpentine pattern 9 that is mainly oriented along the main processing direction, which is parallel to the printing direction. Thereby, in some examples, the PWA printer employs a single ASIC designed for scanning type printers, wherein the print-heads 3 of the print unit 1 are supported by this ASIC in a round robin manner with regard to the generation of halftone image data from the slices 11. Finally, the PWA printer can print the halftone image data (of each slice 11) along the printing direction, wherein some example PWA printers can start printing as soon as the first slice 11 of the series of slices 11 has been completely halftoned.

According to an optional feature, the PWA printer can simultaneously print halftone image data and generate (further) halftone image data. Dividing the continuous tone image into slices 11 as illustrated in FIG. 5 allows the PWA printer to generate halftone image data only from a specific slice 11 of the series of slices 11. As soon as generation of the halftone image data from this specific slice 11 is complete, the PWA printer can start printing this slice 11 and simultaneously generate halftone image data from a succeeding, second slice 11 while printing. This allows the PWA printer to perform two parallel tasks, namely printing a slice 11 and simultaneously generating halftone data from a succeeding slice 11. There may be one or more slices 11 in between the slice 11, which is currently being printed, and the slice 11, which is currently being processed by halftoning. This allows some time-shift between processing and printing a slice 11, for example if the printing speed is slower than the processing speed. However, in some examples, the processing time for halftoning a slice 11 is less than the printing time for printing this slice 11. Alternatively, the first slice 11 and the second slice 11 may be two directly adjacent slices 11 in the printing direction. Thus, even though the PWA printer prints an entire page by a single relative movement between the print unit 1 and the print medium 2, this still allows the "printing while processing" principle within the PWA printer.

Figure 6:
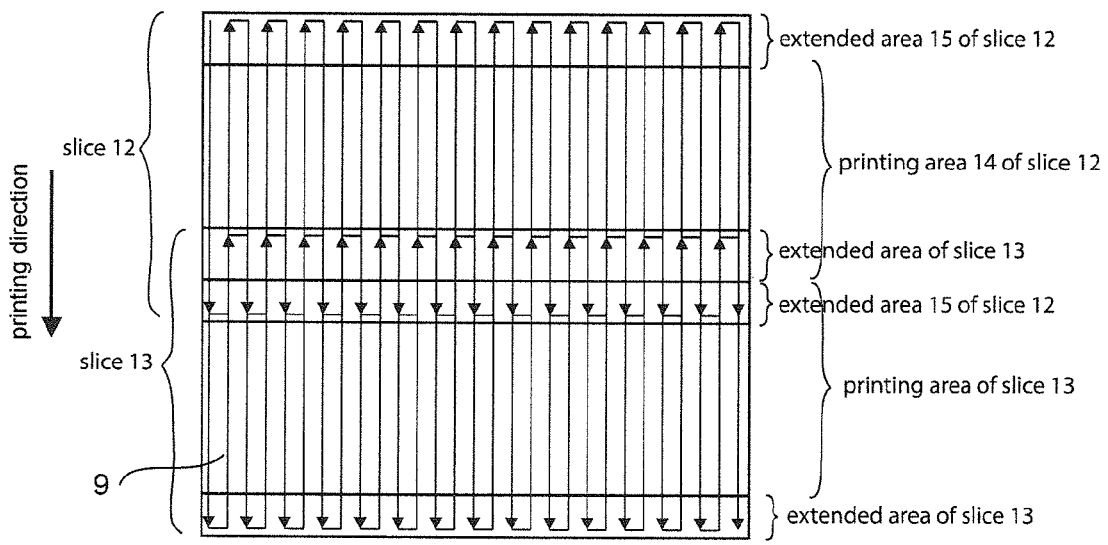
FIG. 6 is an illustration applying halftoning on overlapping slices of a continuous tone image by an example page-wide-array printer.

Referring to FIG. 6, in a further example PWA printer, neighboring slices 12, 13 can overlap each other. This allows the image quality artifacts to be reduced with regard to the error diffusion halftoning, as illustrated with the help of slice 12 in FIG. 6: Slice 12 is split into a printing area 14 and two predetermined extended areas 15. These areas 14, 15 are consecutively arranged along the printing direction, wherein the extended areas 15 are (outer) border regions of the slice 12 and overlaps with adjacent slices 13.

The underlying idea of splitting the slices 12 into such areas 14, 15 is to process halftoning on an entire slice 12 (i.e. the printing area 14 together with the extending areas 15), whereas only the inner regions of this slice 12, i.e. the printing area 14, contributes to the final printout 4. This can prevent image quality artifacts appearing at the slice boundaries (in the printing direction) which are, for example, caused by the serpentine pattern's 9 reversal points, which are located at the slice's boundaries in the printing direction (i.e. the upper and lower boundaries).

Each slice 12 may overlap with each of its immediately neighboring slices 13. Therefore, all slices 12, 13 except the very first slice and the very last slice of the series of slices may have one printing area in between two extended areas. The very first slice and the very last slice may have only one extended area as they have only one neighboring slice. Generally speaking, each slice is split into a printing area and at least two extended areas.

Although the slice is split into different areas, in this example the error diffusion halftoning is uniformly processed slice-wise over each (entire) slice 12 including the printing area 14 and the at least one extended area 16. In other words, the error diffusion halftoning algorithm only sees the entire slice 12 currently being processed as a single uniform region and does not distinguish between the printing area 14 and the extended area(s) 16. Therefore, image quality artifacts caused by boundary effects of the error diffusion algorithm (mainly) appear next to the slice boundaries. Thus, these artifacts (mainly) appear inside the extended area 16, which extends between the slice boundary and the printing area 14, whereas the (inner) printing area 14 of the slice 12 is less, or practically not, affected by these artifacts. Although this is described with the help of example slice 12, this applies to all the slices of the series of slices.

Furthermore, this example PWA printer restricts printing halftone image data generated from the slice to that halftone image data which coincides with the printing area. Therefore, halftone image data that coincides with the extended area is excluded from printing, and, hence, the image quality artifacts, which mainly appear inside the extended areas, are not printed. This allows the reproduction of better image quality when printing continuous tone images using slices. To prevent any undesirable duplication of printing on some regions of the print medium 2 or any gaps in the printout, the print areas of adjacent slices abut against each other in this example.

In some examples, the extended area spans at least a distance/area of pixels that corresponds to a certain diffusion range of the error diffusion halftoning algorithm. As mentioned above, the halftoning algorithm diffuses residuals along the main direction of the processing pattern 9. Therefore, for example, image quality artifacts produced at the reversal points of the serpentine pattern 9 are diffused from the boundary of a slice into inner regions of the slice. However, as discussed before, the diffusion of the residuals (error) is (practically) limited by the diffusion range. In some examples, the extended area spans a number of pixels of the continuous tone image selected from the set of 10, 20, 30, 40, 50, 60, 70, 80, 90, 100, and 200 pixels in the printing direction.

In some examples, processing the error diffusion algorithm is based on only the continuous tone image data as received. Thus, halftoning a particular slice is in no way influenced by results of previously halftoning another (e.g. neighboring) slice. This allows the slices to be processed independently of each other. Additionally, or alternatively, this may mean that any buffers for carrying forward residuals from one slice to an adjacent slice with regard to the halftoning algorithm are not required.

However, in some other examples the slices do not overlap each other. This reduces the required system resources.

As regards further optional features, the PWA can be an ink printer or a laser printer. The print medium 2 can be a sheet of paper, a transparency or a fabric, for example. As regards the ASICs mentioned above, in some examples, this ASIC may be configured to execute only a single halftoning process at one time, i.e. it is not able to carry out halftoning on two regions of the continuous tone image simultaneously. To this end, using a single ASIC means that different slices may be halftoned only one-by-one, for example.

Figure 7:
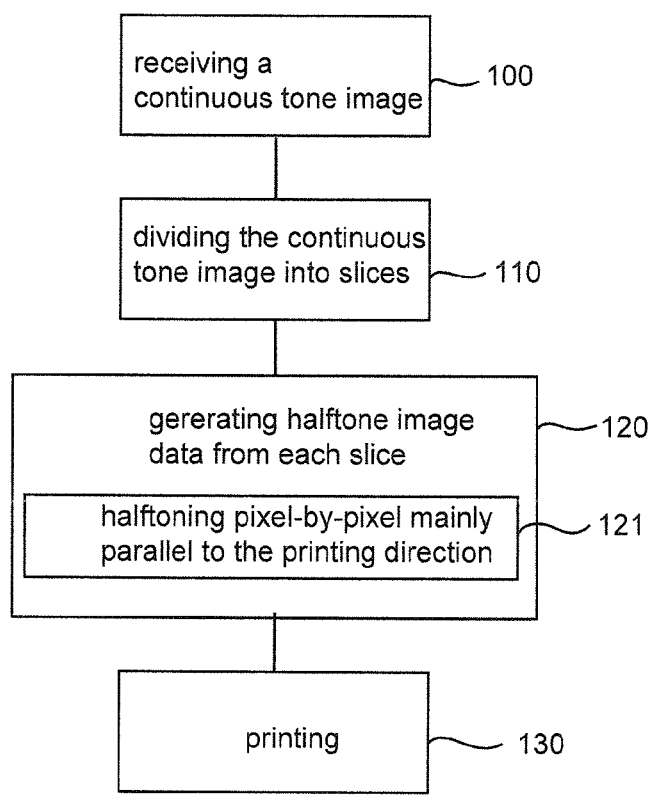
FIG. 7 shows a block diagram of example functions provided by the example page-wide-area printer.

FIG. 7 illustrates as a block diagram the printing using the example PWA printers described before. For example, at 100 the PWA printer receives the continuous tone image. Optionally, at this stage, the PWA printer may already have rasterized some vector data and/or page describing language data to generate this continuous tone image employing a RIP. In other cases, the PWA printer receives the continuous tone image from a computer, for example. Then the PWA printer divides at 110 the continuous tone image into a series of slices along the printing direction. At 120 it generates halftone image data from each of the slices using error diffusion halftoning. As described above, this error diffusion halftoning includes, for example, processing at 121, with regard to error diffusion, each slice pixel-by-pixel following the processing pattern mainly oriented along a main processing direction, which is parallel to the printing direction. Finally, at 130, the PWA printer prints halftone image data along the printing direction.

Now, some more general examples are described:

An example page-wide-array (PWA) printer has a print unit which has an array of print-heads. A printing direction is defined by a relative movement between the print unit and a print medium during the printing process. The PWA printer is configured to receive a continuous tone image and to divide the continuous tone image into a series of slices along the printing direction. Furthermore, the PWA printer is configured to generate halftone image data from each of the slices using error diffusion halftoning, wherein the error diffusion halftoning comprises processing, with regard to error diffusion, each slice pixel-by-pixel following a processing pattern mainly oriented along a main processing direction, which is parallel to the printing direction. Finally, the PWA printer is configured to print halftone image data along the printing direction.

Optionally, the PWA printer is configured to simultaneously generate halftone image data and print halftone image data in that the page-wide-array printer is configured to generate halftone image data from a first slice of the series of slices. Furthermore, it is configured to print the first slice and simultaneously generate halftone image data from an adjacent, second slice of the series of slices.

The error diffusion halftoning algorithm may be processed along a serpentine pattern, wherein the serpentine pattern's reversal points are located at the slice's borders in the printing direction.

According to an example PWA printer, a slice of the series of slices is split along the printing direction into a printing area and at least one predetermined extended area, wherein the extended area is a border region of the slice and overlaps an adjacent slice. Furthermore, the printing area and a printing area of a neighboring slice abut against each other. This example PWA printer is configured to uniformly process error diffusion halftoning over the entire slice including the printing area and the at least one extended area. This PWA printer is also configured to restrict the printing of halftone image data generated from the slice to that halftone image data which coincides with the printing area of the slice. Additionally, the extended area may span a number of pixels of the continuous tone image selected from the set of 10, 20, 30, 40, 50, 60, 70, 80, 90, 100, and 200 pixels in the printing direction.

According to another aspect, a method for printing using such a PWA printer includes receiving a continuous tone image and dividing the continuous tone image into a series of slices along the printing direction. The method further includes generating halftone image data from each of the slices using error diffusion halftoning, wherein the error diffusion halftoning comprises processing, with regard to error diffusion, each slice pixel-by-pixel following a processing pattern mainly oriented along a main processing direction, which is parallel to the printing direction. Finally, the method includes printing halftone image data along the printing direction.

Optionally, simultaneously generating halftone image data and printing halftone image data is achieved by the method including generating halftone image data from a first slice of the series of slices, and printing the first slice and simultaneously generating halftone image data from an adjacent, second slice of the series of slices.

The error diffusion halftoning algorithm can be processed along a serpentine pattern, wherein the serpentine pattern's reversal points are located at the slice's borders in the printing direction.

A further example method includes splitting a slice of the series of slices along the printing direction into a printing area and at least one predetermined extended area, wherein the extended area is a border region of the slice and overlaps an adjacent slice, and wherein the printing area and a printing area of a neighboring slice abut against each other. This example method further includes uniformly processing error diffusion halftoning over the entire slice including the printing area and the at least one extended area, and restricting the printing of halftone image data generated from the slice to that halftone image data which coincides with the printing area of the slice. The extended area may span a number of pixels of the continuous tone image selected from the set of 10, 20, 30, 40, 50, 60, 70, 80, 90, 100, and 200 pixels in the printing direction.

The invention claimed is:

1. A page-wide-array printer comprising a print unit which comprises an array of print-heads,
   wherein a printing direction is defined by a relative movement between the print unit and a print medium during a printing process;
   the page-wide-array printer receives a continuous tone image;
   the page-wide-array printer divides the continuous tone image into a series of slices along the printing direction, wherein a slice of the series of slices is split along the printing direction into a printing area and at least one predetermined extended area, wherein the extended area is a border region of the slice and overlaps an adjacent slice;
   the page-wide-array printer generates halftone image data from each of the slices using error diffusion halftoning, wherein the error diffusion halftoning comprises processing, with regard to error diffusion, each slice pixel-by-pixel following a processing pattern mainly oriented along a main processing direction, which is parallel to the printing direction; and
   the page-wide-array printer prints halftone image data along the printing direction.

2. A page-wide-array printer according to claim 1, wherein the page-wide-array printer simultaneously generates halftone image data and print halftone image data in that the page-wide-array printer
   generates halftone image data from a first slice of the series of slices, and
   prints the first slice and simultaneously generate halftone image data from an adjacent, second slice of the series of slices.

3. A page-wide-array printer according to claim 1, wherein the error diffusion halftoning is processed along a serpentine pattern, wherein the serpentine pattern's reversal points are located at the slice's borders in the printing direction.

4. A page-wide-array printer according to claim 1, wherein the printing area and a printing area of a neighboring slice abut against each other; and
   wherein the page-wide-array printer uniformly processes error diffusion halftoning over the entire slice including the printing area and the at least one extended area, and restricts the printing of halftone image data generated from the slice to that halftone image data which coincides with the printing area of the slice.

5. A page-wide-array printer according to claim 4, wherein the extended area spans a number of pixels of the continuous tone image selected from the set of 10, 20, 30, 40, 50, 60, 70, 80, 90, 100, and 200 pixels in the printing direction.

6. A page-wide-array printer according to claim 1, wherein the page-wide-array printer is selected from a set of an ink printer and a laser printer.

7. A method for printing using a page-wide-array printer, wherein the page-wide-array printer comprises a print unit which comprises an array of print-heads, and wherein a printing direction is defined by a relative movement between the print unit and a print medium during a printing process; comprising:

receiving a continuous tone image;

dividing the continuous tone image into a series of slices along the printing direction;

splitting a slice of the series of slices along the printing direction into a printing area and at least one predetermined extended area, wherein the extended area is a border region of the slice and overlaps an adjacent slice;

generating halftone image data from each of the slices using error diffusion halftoning, wherein the error diffusion halftoning comprises processing, with regard to error diffusion, each slice pixel-by-pixel following a serpentine processing pattern mainly oriented along a main processing direction, which is parallel to the printing direction; and printing halftone image data along the printing direction.

8. A method according to claim 7, wherein simultaneously generating halftone image data and printing halftone image data is achieved by the method comprising:

generating halftone image data from a first slice of the series of slices, and printing the first slice and simultaneously generating halftone image data from an adjacent, second slice of the series of slices.

9. A method according to claim 7, wherein the error diffusion halftoning is processed along a serpentine pattern, wherein the serpentine pattern's reversal points are located at the slice's borders in the printing direction.

10. A method according to claim 7, comprising:

wherein the printing area and a printing area of a neighboring slice abut against each other;

uniformly processing error diffusion halftoning over the entire slice including the printing area and the at least one extended area; and restricting the printing of halftone image data generated from the slice to that halftone image data which coincides with the printing area of the slice.

11. A method according to claim 10, wherein the extended area spans a number of pixels of the continuous tone image selected from the set of 10, 20, 30, 40, 50, 60, 70, 80, 90, 100, and 200 pixels in the printing direction.

12. A method according to claim 7, wherein the page-wide-array printer is selected from a set of an ink printer and a laser printer.

13. A method according to claim 7, wherein the at least one predetermined extended area is included in a plurality of predetermined extended areas that each span a respective area of a plurality of print slices.

14. A method according to claim 13, wherein a total number of the plurality of predetermined extended areas is comparatively less than a total number slices in the series of slices.

15. A method according the 7, wherein the serpentine pattern includes reversal points located at the slice's borders in the printing direction.

* * * * *

UNITED STATES PATENT AND TRADEMARK OFFICE
CERTIFICATE OF CORRECTION

PATENT NO.       : 8,848,251 B2  
APPLICATION NO.  : 13/753777  
DATED            : September 30, 2014  
INVENTOR(S)      : Sergio Puigardeu Aramendia et al.

Page 1 of 1

It is certified that error appears in the above-identified patent and that said Letters Patent is hereby corrected as shown below:

In the Claims

In column 10, line 33, in Claim 15, delete "the" and insert -- to claim --, therefor.

Signed and Sealed this  
Second Day of June, 2015

Michelle K. Lee  
*Director of the United States Patent and Trademark Office*